(12) United States Patent
Veenstra

(10) Patent No.: US 8,302,997 B2
(45) Date of Patent: Nov. 6, 2012

(54) VEHICLE FUEL STORAGE SYSTEM

(75) Inventor: Michael Jon Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 12/917,068

(22) Filed: Nov. 1, 2010

(65) Prior Publication Data

US 2011/0140483 A1 Jun. 16, 2011

(51) Int. Cl.
*B60P 3/22* (2006.01)

(52) U.S. Cl. ........ 280/834; 280/831; 280/832; 280/833; 180/314; 180/69.5; 137/267; 220/532; 220/564; 224/309; 224/311

(58) Field of Classification Search ................. 280/834, 280/831, 832, 833; 180/314, 69.5; 137/267; 220/532–564; 224/309, 311
See application file for complete search history.

(56) References Cited

U.S. PATENT DOCUMENTS

| | | | |
|---|---|---|---|
| 3,696,979 A * | 10/1972 | Erickson | 224/309 |
| 6,367,573 B1 | 4/2002 | Scott | |
| 6,412,588 B1 | 7/2002 | Scott et al. | |
| 6,418,962 B1 * | 7/2002 | Wozniak et al. | 137/266 |
| 6,439,334 B1 | 8/2002 | Myers et al. | |
| 6,527,075 B1 * | 3/2003 | Izuchukwu et al. | 180/69.5 |
| 6,609,863 B1 * | 8/2003 | Morioka et al. | 410/68 |
| 6,679,673 B1 * | 1/2004 | Stahler et al. | 414/467 |
| 7,137,474 B2 | 11/2006 | Yokote | |
| 7,303,211 B2 | 12/2007 | Borroni-Bird et al. | |
| 7,434,611 B2 | 10/2008 | Wunderlich et al. | |
| 7,976,067 B2 * | 7/2011 | Naganuma et al. | 280/834 |
| 2007/0137907 A1 | 6/2007 | Amori et al. | |
| 2008/0006461 A1 | 1/2008 | Naganuma | |

FOREIGN PATENT DOCUMENTS

| | | |
|---|---|---|
| JP | 11-348839 A | 12/1999 |
| JP | 2001-102073 A | 4/2001 |
| JP | 2001-239845 A2 | 9/2001 |
| JP | 2003-149071 A2 | 5/2003 |
| JP | 2005-044551 A2 | 2/2005 |

OTHER PUBLICATIONS

Sound Transit: ST Express 40-foot CNG Bus Specifications (New Flyer); website: http://www.soundtransit.org/x4646.xml, Apr. 9, 2009, 2 pgs.
Red, Chris, "The Outlook for Composite Pressure Vessels," Compositeworld.com, http://www.compositesworld.com/articles/the-outlook-for-composite-pressure-vessels, Jan. 22, 2009, 5 pgs.

* cited by examiner

*Primary Examiner* — Lesley D Morris
*Assistant Examiner* — Marlon Arce
(74) *Attorney, Agent, or Firm* — Brooks Kushman P.C.; Damian Porcari

(57) ABSTRACT

A system for integrating and embedding a fuel storage tank in the roof of an automotive vehicle is provided. The automotive vehicle may include a roof assembly having inner roof panels and outer roof panels. The roof panels may define a cavity that protrudes into the passenger compartment below the roof line of the automotive vehicle. A pressurized fuel tank may be disposed within the cavity of the roof assembly.

19 Claims, 3 Drawing Sheets

US 8,302,997 B2

VEHICLE FUEL STORAGE SYSTEM

BACKGROUND

Alternative energy automotive vehicles may be powered by hydrogen fuel or other alternative compressed fuels. One challenge with alternative fuel vehicles and hydrogen fuel cell vehicles in particular is packaging and storing enough fuel on the vehicle in order to achieve an acceptable driving range, while still maintaining cargo and passenger capacity as well as the vehicle's aesthetic design. For example, in order to have a vehicle driving range of at least 200 miles, a fuel cell vehicle may require approximately 160 liters to 235 liters of vehicle space for hydrogen fuel depending on the storage pressure.

Additionally, the compressed fuels must be stored at high pressures. For example, hydrogen fuel may be stored at a pressure of 5,000 pounds per square inch (psi) and even up to pressures greater than 10,000 psi. In order to withstand this pressure, the fuel storage tanks may be a pressure vessel having a cylindrical shape in order to evenly distribute the stress and increase the strength. The cylindrical-shaped fuel storage tanks further exacerbate the challenges of packaging alternative fuels since the pressure vessel is unable to conform to the available space within the vehicle, unlike conventional gasoline fuel tanks.

In order to package cylindrical fuel storage tanks with enough capacity, many configurations have been considered. For example, fuel storage tanks may be mounted under the hood of a vehicle. However, this design still may store significantly less than the target fuel capacity unless the hood and aesthetic look of the vehicle is modified.

Fuel storage tanks may also be mounted in the cargo or passenger area of a vehicle. While this design would allow more fuel capacity, the cargo utilization or passenger capacity of the vehicle would be adversely affected.

SUMMARY

An embodiment of the present invention provides a system for integrating and embedding a fuel storage tank in the roof of a vehicle.

An embodiment of the present invention may include an automotive vehicle roof assembly having inner roof panels and outer roof panels. The roof panels may define a housing that protrudes into the cabin of the automotive vehicle. Additionally, a fuel tank may be disposed within the housing of the roof assembly.

Another embodiment of the present invention may include a roof structure which defines a roof line of an automotive vehicle. A cavity may be formed in the roof structure. Also, a fuel tank may be located within the cavity so that that at least a portion of the fuel tank lies below the roof line.

A further embodiment of the present invention may include an automotive vehicle having a vehicle body structure having a pair of side body panels. A roof structure may connect the pair of side body panels and define a roof line of the vehicle between the side body panels. The roof structure may also include an outer roof panel disposed above the roof line. A fuel tank adapted to store pressurized fuel may be embedded in the roof structure. When embedded in the roof structure, at least a portion of the fuel tank may be disposed below the roof line and protrude into the passenger compartment. The fuel tank may be covered by the outer roof panel.

DETAILED DESCRIPTION

As required, detailed embodiments of the present invention are disclosed herein; however, it is to be understood that the disclosed embodiments are merely exemplary. The invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
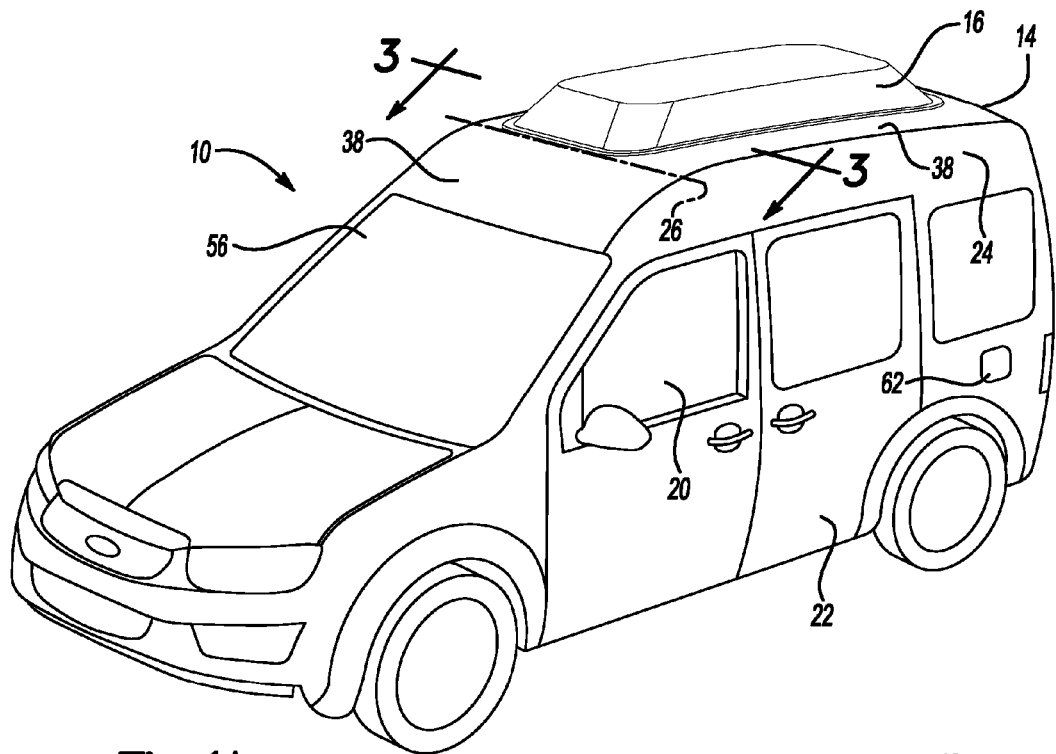
FIG. 1A is a perspective view of a vehicle having an integrated fuel tank storage system according to one embodiment of the present invention.

FIG. 1A illustrates a vehicle 10 having a fuel tank storage system 12 integrated into the roof structure 14 of the vehicle 10. As shown in FIG. 1A, the fuel tanks 12 may be covered with an outer roof cover 16 so that the fuel tanks 12 may be hidden and concealed. As with alternative fuel vehicles such as fuel cells or hydrogen internal combustion hybrid electric vehicles, it is a challenge to package enough hydrogen fuel on the vehicle in order to achieve an acceptable driving range for consumers. The packaging issues with alternative fuels are compounded because of the high pressure associated with compressed fuel gases such as compressed natural gas or compressed hydrogen where the fuel tank generally has a circular cross section.

Figure 1B:
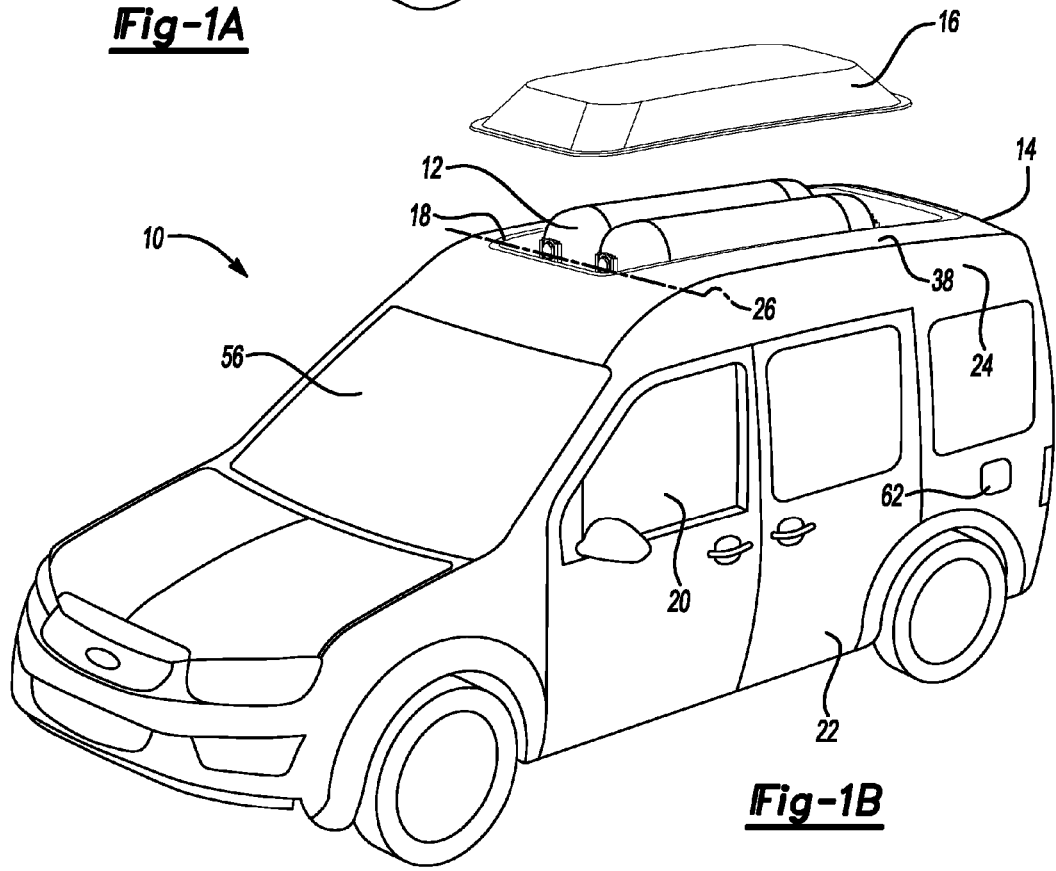
FIG. 1B is a perspective view of a vehicle having an integrated fuel tank storage system according to one embodiment of the present invention.

FIG. 1B illustrates one embodiment of the present invention where an outer roof cover 16 is removed to show the fuel storage tanks 12 integrated and embedded in a cavity 18 in the roof structure 14 of the vehicle 10. The fuel tanks 12 are stored in a roof assembly 14 having an outer roof cover 16 which covers the fuel tanks 12. The cavity 18 of the roof structure assembly 14 may be an inner roof shell 18 which protrudes into the passenger compartment 20 of the vehicle 10 and provides mounting features for the fuel tanks 12.

The roof structure assembly 14 housing the embedded fuel storage tanks 12 may be connected to the vehicle body structure 22. The roof structure assembly 14 may attach to a vehicle body structure 22 along each of the side body panels 24. In order to maintain the vehicle styling, the roof structure assembly 14 may include a primary roof panel 38 which may retain the contour of the roof panel of a conventional vehicle. The primary roof panel 38 may also define the roof line 26 of the vehicle 10. The roof line 26 may be along the plane where the roof structure 14 is joined to the side body panels 24. More specifically, the roof line 26 may be along the plane where the primary roof panel 38 joins the side body panels 24.

By embedding the fuel tanks 12 in the roof structure assembly 14 instead of mounting the tanks 12 directly on the roof of a vehicle, there may be several advantages. For example, the height of the vehicle 10 may be minimized where at least a portion of the fuel tanks 12 are embedded below the roof line 26. Additionally, where the fuel storage tanks 12 are embedded in the roof structure 14, the adverse effects to performance metrics, such as drag, fuel efficiency and center of gravity, may be minimized. Further, exposed fuel storage tanks mounted directly to the roof may detract from the aesthetic look and design of a conventional vehicle.

Figure 2:
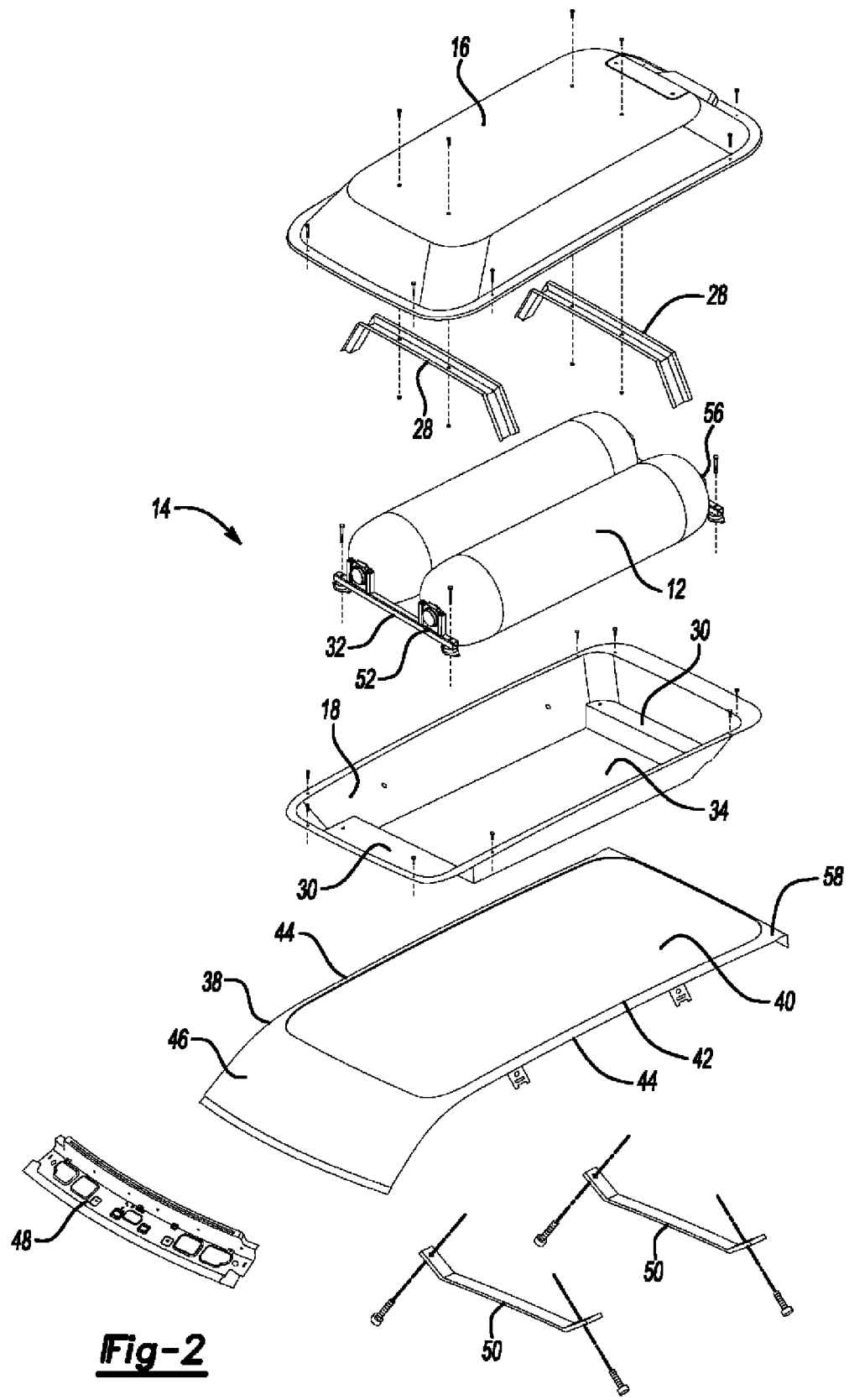
FIG. 2 is an exploded view of a portion of the vehicle from FIG. 1 showing the integrated fuel tank storage system.

FIG. 2 illustrates an exploded view of the roof structure 14 according to one embodiment of the present invention. The roof structure assembly 14 may include an outer roof cover 16. The outer roof cover 16 may have a longitudinal concave portion oriented along the length of the vehicle 10 and shaped to have aerodynamic features as well as for aesthetic purposes. The outer roof cover 16 may be lightweight and designed to cover the fuel tanks 12 in order to protect them from debris or environmental damage.

The roof structure 14 may include supports 28 which may be attached to the outer roof cover 16. The supports 28 may provide rigidity to the outer roof cover 16 and allow the outer roof cover 16 to be more lightweight and, therefore, allow the outer roof cover 16 to be less expensive. The supports 28 may be mounted to the outer roof cover 16 along a top portion of the outer roof cover 16. They may also be mounted along the sides of the roof structure 14.

The roof structure 14 may also include the inner roof shell 18. The inner roof shell 18 may be a tub which defines a cavity in which the fuel tanks 12 are placed. The tub 18 may be defined by a cavity which has a longitudinal concave portion oriented along the length of the vehicle 10. The cavity or tub 18 may be formed to have at least one step portion 30 on which a bracket 32 may be mounted to support the fuel tanks 12 and a floor portion 34 which further defines the cavity to hold the full diameter of the fuel tanks 12. The floor portion 34 may also define the ceiling 36 in the passenger cabin 20. The inner roof shell 18 may be formed of stamped metal such as aluminum. Alternatively, the inner roof shell 18 may be plastic, composite or molded of any other suitable material for forming the tub 18.

The roof structure 14 may also include the roof panel 38. The roof panel 38 may be a primary roof panel formed to define a typical contour of the roof of a conventional vehicle. Additionally, the roof panel 38 may have a generally flat planar upper roof line portion 42 which may define the typical roof line 26 of a vehicle 10. The primary roof panel 38 may have an aperture 40 formed along an upper roof line portion 42. The aperture 40 may be sized to receive the fuel tanks 12. Alternatively, the aperture 40 may be configured to receive the inner roof shell 18 in which the fuel tanks 12 are adapted to be mounted.

The roof panel 38 may be attached and connected to the side body panels 24 along the sides 44. When attached to the side body panels 24, the upper roof line portion 42 may be generally perpendicular to the generally vertical side body panels 24. The roof panel 38 may be attached to the side body panels 24 by typical attachment methods such as welding or fastening.

In an alternate embodiment of the present invention, it is also contemplated that the roof panel 38 may be formed to integrally include the inner roof shell 18 along the upper roof line portion 42. In this embodiment, the roof panel 38 and the inner roof shell 18 may be formed as one piece. The one-piece roof panel 38 with a cavity 18 may be formed by stamping a metal sheet, or molding a composite or plastic material, for example. In another embodiment of the present invention, a typical roof panel for a vehicle may be provided and subsequently modified by forming the aperture 40 along at least a portion of the upper roof line portion 42.

Along a front portion 46 of the roof panel 38, the roof panel 38 may be connected to a windshield 56 of a vehicle 10. Whereas the upper roof line portion 42 of the roof panel 38 may be generally planar to define the roof line 26 of the vehicle, the front portion 46 of the roof panel 38 may slope downwards for aerodynamic purposes and to maintain the roof contours of a conventional vehicle.

The roof structure assembly 14 may also include a front cross rail 48 mounted below the front portion 46 of the roof panel 38. The front cross rail 48 may be welded or bolted to the side panels 24 to provide rigidity. Generally, the front cross rail 48 may be attached to the A-pillar region of the side body panel. The front cross rail 48 may be generally planar and formed of stamped metal. Likewise, there may also be a back cross rail (not shown) mounted adjacent a back portion 58 of the roof panel 38.

The roof structure 14 may also include a cross member support 50. The cross member support 50 may be concave-shaped or generally U-shaped. The concave-shaped cross member supports 50 may extend below the roof panel 38 and the roof line 26 and be located under the fuel tanks 12. The cross member support 50 may be mounted to the roof panel 38 or to the side body panels 24 adjacent the roof panel 38.

In one embodiment of the present invention, there may be a pair of cross member supports 50. Because the roof panel 38 may have an aperture 40 which may extend across a substantial portion of upper roof line portion 42, additional support structures may be required to maintain the vehicle's strength and rigidity. As such, the cross member supports 50 may be transverse support members connecting the side body panels 24 across the aperture 40 in order to add rigidity to the vehicle in the transverse direction. The cross member supports 50 may be connected to the side body panels 24 adjacent the B-pillar and the C-pillar of the vehicle 10 in order to provide additional strength and rigidity to the vehicle 10.

The cross member supports 50 may also be designed to support the weight of the fuel tanks 12. In one embodiment of the present invention, the cross member supports 50 may be located under the step portions 30 of the inner roof shell 18 in order to support the bracket 32 of the fuel tanks 12.

In another embodiment of the present invention, it is also contemplated that the roof panel 38 may be integrally formed with the cross member supports 50 and the brackets 32 in order to accommodate the fuel tanks 12. In this embodiment, the roof structure 14 may not include an inner roof shell 18 and the cross member supports 50 may define the housing 60 for the fuel tanks 12. The cross member supports 50 may also provide the mounting position for the fuel tank brackets 32. In another embodiment of the present invention, the cross member supports 50 may not support the fuel tanks 12 and only provide structural strength and rigidity to the vehicle 10.

As shown in FIGS. 1-4, the fuel tanks 12 may be oriented lengthwise in a longitudinal direction along the vehicle 10. In this configuration, the tanks 12 may be connected to a bracket 32 along a neck portion 52 in the front of the tanks 12. If the tanks 12 are mounted lengthwise in the roof structure 14, the front of the fuel tanks 12 may also include a pressure release valve. The back of the fuel tanks 12 may include a solenoid and regulator 54 for filling and dispensing fuel from the tanks 12. In this way, the active end of the tank 12 may be easily accessible along the rear of the vehicle 10 for filling and dispensing fuel or from a back side-panel fuel door 62, for example.

Once assembled, the roof structure 14 may form a sandwiched roof structure assembly 14 that holds the fuel tanks 12. The inner roof shell 18 may be located in the aperture 40 of the roof panel 38 and secured to the roof panel 38 so that the tub 18 extends below the roof line 26 of the vehicle 10 and protrudes into the passenger compartment 20. The inner roof shell 18 may be mounted or fastened to the roof panel 38 with fasteners or by typical methods such as welding. The fuel tanks 12 then may be mounted in the inner roof shell 18 or to the cross member support 50. Subsequently, the outer roof 16 may then be fastened to the roof panel 38 or the inner roof shell 18 in order to cover the fuel tanks 12 as well as the aperture 40 in the roof panel 38.

Figure 3:
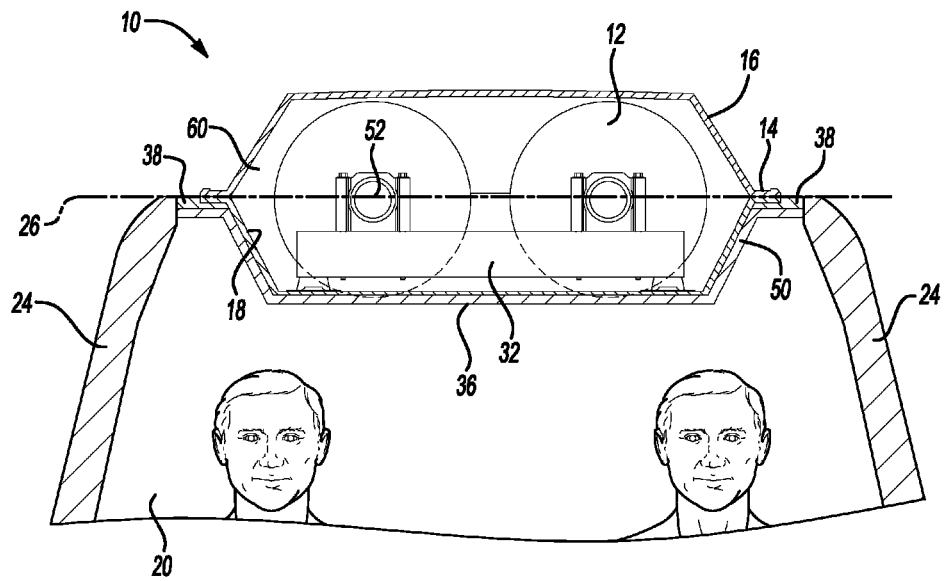
FIG. 3 is a front section view along section 3-3 in FIG. 1A showing the integrated fuel tank storage system.

FIG. 3 illustrates the sandwiched roof structure 14 in a front section view along section 3-3 in FIG. 1A. The outer roof cover 16 and the inner roof shell 18 may mate together so that the longitudinal concave portions of the inner roof shell 18 and the outer roof cover 16 form the housing 60 for the fuel tanks 12. The neck 52 of the fuel tank 12 may be mounted to a bracket 32 and the bracket 32 may be mounted to the step portion 30 of the inner roof shell 18. In one embodiment, the inner roof shell 18 and bracket 32 may be subsequently mounted to the cross member support 50. The outer roof cover 16 and the inner roof shell 18 may be mounted to the roof panel 38 and the roof panel 38 may then be attached to the side body panels 24.

As further shown in the cross section view, the inner roof shell 18 and the cross member support 50 may define the ceiling 36 of the passenger cabin 20. By having a fuel tank housing 60 that protrudes into the cabin, at least a portion of the fuel tank 12 may be disposed below the roof line 26 of the vehicle 10. The passenger compartment 20 of the vehicle 10 may further include trim features which may be attached to the inner roof shell 18 or cross member supports 50 to provide aesthetic features of the passenger compartment 20 or the ceiling 36.

As illustrated in the front section view, the fuel tanks 12 may be oriented in the roof structure assembly 14 so that at least half the volume of the fuel tanks 12 is disposed in the cavity 18 located below the roof line 26 and within the vehicle body structure 22. As such, the cavity 18 may extend below the roof line 26 and have a depth at least as great as half the diameter of the fuel tank 12. Likewise, the remaining volume of the fuel tanks 12 may be disposed above the roof line 26 and covered by the outer roof cover 16. If at least half of the volume of the fuel tanks 12 is disposed below the roof line 26, at least half the diameter of the circular cross section of the fuel tanks 12 is located below the roof line 26. As such, the height of the vehicle may only be extended by half the diameter of the fuel tanks 12.

In one embodiment of the present invention, the roof structure 14 may accommodate at least two fuel tanks 12 oriented lengthwise along the vehicle 10 where the fuel tanks 12 may have a diameter of a size that minimizes the fuel tank 12 above and below the roof line while maximizing the capacity of fuel to in order to provide the desired vehicle range. For example, the roof structure 14 may accommodate two or more fuel tanks 12 where the fuel tanks 12 may have a circular diameter of approximately 200 mm to 400 mm and a length of approximately 2000 mm. The dimensions and number of fuel tanks 12 may also vary depending on the dimensions of the vehicle 10.

Figure 4:
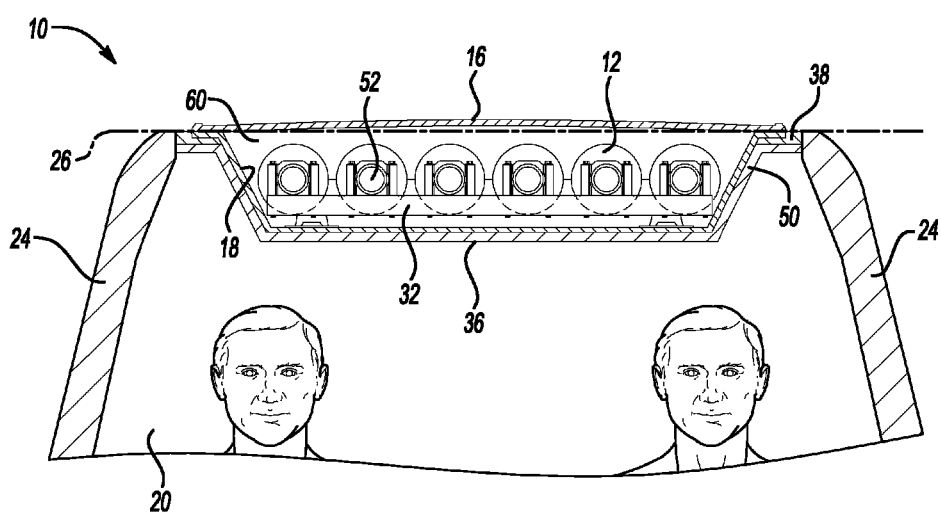
FIG. 4 is an exemplary front section view illustrating an alternate embodiment of the integrated fuel tank storage system according to one embodiment of the present invention.

FIG. 4 illustrates an exemplary front section view of an alternate embodiment of the present invention. In this embodiment, the fuel tanks 12 may have a smaller diameter so that the fuel tanks 12 may not protrude as far into the passenger cabin 20 or do not extend above the roof line 26. As shown in FIG. 4, a greater number of smaller diameter fuel tanks 12 may be located in the roof structure housing 14 so that the fuel tanks 12 do not extend above the roof line 26 and approximately the full diameter of the tanks protrudes into the passenger compartment 20. In this configuration, the entire volume of the fuel tanks may be embedded within the roof structure 14 below the roof line 26.

It is also contemplated that the fuel tanks 12 may be oriented in an alternate configuration such as crosswise. In this alternate configuration, the fuel tanks 12 may be shorter but additional tanks 12 may be located along the length of the vehicle 10 in a transverse direction.

In an alternate configuration, the fuel tanks 12 may be embedded further within the passenger compartment 20 so that less of the tanks 12 extend above the roof line 26 of the vehicle 10. In this embodiment, the inner roof shell 18 and the false interior of the vehicle 10 may include cut-outs which are contoured to the fuel tanks 12 to provide additional headroom to passengers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. An automotive vehicle having a passenger compartment, the automotive vehicle comprising:
    a vehicle body structure including a pair of side body panels;
    a roof structure connecting the pair of side body panels and defining a roof line therebetween, the roof structure including an outer roof panel disposed above the roof line; and
    a fuel tank adapted to store pressurized fuel, the fuel tank embedded in the roof structure such that at least a portion of the fuel tank is disposed below the roof line and protrudes into the passenger compartment, the fuel tank being covered by the outer roof panel.

2. The automotive vehicle of claim 1 wherein the roof structure further includes an inner roof panel sandwiched between a primary roof panel which connects the side body panels and the outer roof panel, the primary roof panel defining the roof line between the pair of side body panels, the inner roof panel being disposed below the roof line and protruding into the passenger compartment.

3. The automotive vehicle of claim 2 wherein the outer roof panel and the inner roof panel form a housing in which the fuel tank is embedded.

4. The automotive vehicle of claim 3 wherein the inner roof panel defines a ceiling in the passenger compartment.

5. The automotive vehicle of claim 3 wherein the primary roof panel includes an aperture formed along the roof line and the inner roof panel is disposed in the aperture.

6. The automotive vehicle of claim 5 further comprising at least one transverse support member connecting the vehicle body structure across the aperture to increase the rigidity of the vehicle in the transverse direction.

7. An automotive vehicle having a cabin, the vehicle comprising:
    a roof assembly including inner and outer roof panels defining a housing that protrudes into the cabin; and
    a fuel tank disposed within the housing,
    wherein the inner and outer panels include longitudinal concave portions that define the housing along the length of the vehicle.

8. The automotive vehicle of claim 7 wherein the fuel tank is oriented in the longitudinal direction.

9. The automotive vehicle of claim 7 wherein the inner roof panel protrudes into the cabin and defines a ceiling of the cabin.

10. The automotive vehicle of claim 7 further comprising a primary roof panel having an aperture, the inner roof panel being disposed in the aperture.

11. The automotive vehicle of claim 10 further comprising at least one transverse support member disposed across the aperture to increase the rigidity of the vehicle in the transverse direction.

12. An automotive vehicle comprising:
    a roof structure defining a roof line of a passenger compartment therebelow and having a cavity formed therein; and
    a fuel tank disposed within the cavity such that at least a portion of the fuel tank lies below the roof line.

13. The automotive vehicle of claim 12 wherein at least half of the volume of the fuel tank is disposed in the cavity and located below the roof line.

14. The automotive vehicle of claim 12 wherein the cavity extends below the roof line and has a depth at least as great as half the diameter of the fuel tank.

15. The automotive vehicle of claim 12 wherein the roof structure further includes an outer roof panel which covers the fuel tank.

16. The automotive vehicle of claim 12 wherein the cavity is sized to receive at least two fuel tanks.

17. The automotive vehicle of claim 12 further comprising at least one transverse support member adapted to provide rigidity to the vehicle in the transverse direction.

18. The automotive vehicle of claim 17 wherein the transverse support member is concave and the fuel tank is mounted to the transverse support member such that the transverse support member supports the weight of the tank.

19. The automotive vehicle of claim 12 wherein the fuel tank is oriented in the longitudinal direction and a filling device of the fuel tank is located adjacent the rear of the vehicle.

\* \* \* \* \*